(12) United States Patent
Esaki

(10) Patent No.: US 8,944,145 B2
(45) Date of Patent: Feb. 3, 2015

(54) VEHICLE SEAT AIR-CONDITIONER AND VEHICLE TEMPERATURE CONTROLLER

(75) Inventor: Hidenori Esaki, Utsunomiya (JP)

(73) Assignee: Honda Motor Co., Ltd., Tokyo (JP)

( * ) Notice: Subject to any disclaimer, the term of this patent is extended or adjusted under 35 U.S.C. 154(b) by 1132 days.

(21) Appl. No.: 12/894,723

(22) Filed: Sep. 30, 2010

(65) Prior Publication Data

US 2011/0017421 A1 Jan. 27, 2011

Related U.S. Application Data

(62) Division of application No. 11/213,594, filed on Aug. 26, 2005, now Pat. No. 7,828,050.

(30) Foreign Application Priority Data

| Sep. 2, 2004 | (JP) | 2004-255524 |
| Sep. 14, 2004 | (JP) | 2004-266642 |
| Sep. 15, 2004 | (JP) | 2004-268139 |

(51) Int. Cl.
*B60H 1/00* (2006.01)
*B60H 1/32* (2006.01)
*A47C 7/74* (2006.01)
(Continued)

(52) U.S. Cl.
CPC .......... *B60N 2/5635* (2013.01); *B60H 1/00285* (2013.01); *B60N 2/5628* (2013.01); *B60N 2/5825* (2013.01); *B60H 2001/003* (2013.01)
USPC .................. 165/42; 165/41; 165/202; 62/244; 297/180.1; 297/180.13; 297/180.14

(58) Field of Classification Search
CPC .... B60H 1/00285; B60N 2/56; B60N 2/5621; B60N 2/5628; B60N 2/5635; B60N 2/5642; B60N 2/565; B60N 2/5657; A47C 7/74
USPC .................. 165/41, 42, 43, 44, 202, 203, 204; 62/244; 297/180.1, 180.11, 180.12, 297/180.13, 180.14
See application file for complete search history.

(56) References Cited

U.S. PATENT DOCUMENTS

| 5,921,100 A | 7/1999 | Yoshinori et al. |
| 5,934,748 A | 8/1999 | Faust et al. |

(Continued)

FOREIGN PATENT DOCUMENTS

| DE | 3818406 A1 * | 12/1989 | ............... A47C 1/16 |
| DE | 3938951 A1 * | 5/1990 | ............... A47C 7/74 |

(Continued)

*Primary Examiner* — Ljiljana Ciric
(74) *Attorney, Agent, or Firm* — Rankin, Hill & Clark LLP

(57) ABSTRACT

A vehicle seat air-conditioner includes a seat on which an occupant sits, a heat exchanger that adjusts the temperature of a conditioned gas, a blower that supplies the conditioned gas to the seat, a seat covering layer provided on a surface of the seat and facing the seated occupant, and a flow channel provided on an underside of the seat covering layer that pass the conditioned gas that is introduced by the blower. The vehicle seat air-conditioner is adapted to convey heat of the conditioned gas to an occupant side of the seat covering layer by directly blowing out a portion of the introduced conditioned gas to the occupant side of the seat covering layer, and to perform heat exchange with the occupant side of the seat covering layer by circulating a portion of a remainder of the conditioned gas through the flow channel.

19 Claims, 9 Drawing Sheets

(51) Int. Cl.
 *B60N 2/56* (2006.01)
 *B60N 2/58* (2006.01)

(56) References Cited

U.S. PATENT DOCUMENTS

| | | | |
|---|---|---|---|
| 6,059,018 A | 5/2000 | Yoshinori et al. | |
| 6,079,485 A | 6/2000 | Esaki et al. | |
| 6,105,667 A | 8/2000 | Yoshinori et al. | |
| 6,857,697 B2 | 2/2005 | Brennan et al. | |
| 6,871,696 B2 | 3/2005 | Aoki et al. | |
| 7,083,227 B2 | 8/2006 | Brennan et al. | |
| 7,131,689 B2 | 11/2006 | Brennan et al. | |
| 7,201,441 B2 | 4/2007 | Stoewe et al. | |
| 7,213,876 B2 | 5/2007 | Stoewe | |
| 7,338,117 B2 | 3/2008 | Iqbal et al. | |
| 7,356,912 B2 | 4/2008 | Iqbal et al. | |
| 7,370,911 B2 | 5/2008 | Bajic et al. | |
| 8,672,411 B2 * | 3/2014 | Gomes et al. | 297/180.13 |
| 8,678,492 B2 * | 3/2014 | Benton | 297/180.14 |
| 8,702,164 B2 * | 4/2014 | Lazanja et al. | 297/180.12 |
| 8,702,165 B2 * | 4/2014 | Oota | 297/180.14 |
| 8,727,434 B2 * | 5/2014 | Sahashi | 297/180.14 |
| 8,752,891 B2 * | 6/2014 | Yoshimoto et al. | 297/180.12 |
| 8,752,892 B2 * | 6/2014 | Sahashi | 297/180.14 |
| 8,777,320 B2 * | 7/2014 | Stoll et al. | 297/180.13 |
| 8,789,883 B2 * | 7/2014 | Itou et al. | 297/180.14 |
| 2002/0096915 A1 * | 7/2002 | Haupt et al. | 297/180.13 |
| 2003/0102699 A1 * | 6/2003 | Aoki et al. | 297/180.14 |
| 2004/0118555 A1 * | 6/2004 | Fristedt et al. | 165/202 |
| 2004/0139758 A1 * | 7/2004 | Kamiya et al. | 62/244 |
| 2004/0189061 A1 * | 9/2004 | Hartwich et al. | 297/180.14 |
| 2004/0195870 A1 * | 10/2004 | Bohlender et al. | 297/180.1 |
| 2014/0090829 A1 * | 4/2014 | Petrovski | 165/203 |
| 2014/0130516 A1 * | 5/2014 | Lofy | 297/180.12 |
| 2014/0305625 A1 * | 10/2014 | Petrovski | 165/203 |

FOREIGN PATENT DOCUMENTS

| | | | | | |
|---|---|---|---|---|---|
| DE | 3903303 | A1 * | 8/1990 | | A47C 7/74 |
| EP | 280213 | A1 * | 8/1988 | | A47C 7/74 |
| EP | 407362 | A1 * | 1/1991 | | A47C 7/74 |
| EP | 411375 | A1 * | 2/1991 | | A47C 7/74 |
| FR | 2694527 | A1 * | 2/1994 | | B60N 2/00 |
| JP | 58004616 | A | * | 1/1983 | B60H 1/24 |
| JP | 59081233 | A | * | 5/1984 | B60N 1/00 |
| JP | 59081234 | A | * | 5/1984 | B60N 1/00 |
| JP | 59213511 | A | * | 12/1984 | B60H 1/22 |
| JP | 60064017 | A | * | 4/1985 | B60H 1/00 |
| JP | 05000623 | A | * | 1/1993 | B60H 1/34 |
| JP | 05277020 | A | * | 10/1993 | A47C 7/74 |
| JP | 05301516 | A | * | 11/1993 | B60H 1/00 |
| JP | 10-297243 | | | 11/1998 | |
| JP | 2001-145542 | | | 5/2001 | |
| JP | 2004-008334 | | | 1/2004 | |

\* cited by examiner

VEHICLE SEAT AIR-CONDITIONER AND VEHICLE TEMPERATURE CONTROLLER

BACKGROUND OF THE INVENTION

1. Field of the Invention

This invention relates to a vehicle seat air-conditioner that performs air conditioning through a seat on which an occupant sits, and a vehicle temperature controller that carries out integrated control of air conditioning inside the vehicle and temperature adjustment of the seat portion.

The present application claims priority on Japanese Patent Application No. 2004-255524, filed Sep. 2, 2004, Japanese Patent Application No. 2004-266642, filed Sep. 14, 2004, and Japanese Patent Application No. 2004-268139, filed Sep. 15, 2004, the contents of which are incorporated herein by reference.

2. Description of Related Art

A vehicle seat air-conditioner has been devised to heat or cool an occupant by providing a heat-exchange chamber on the underside of the seat covering layer that contacts the seated occupant, and controlling the conditioned air (conditioned gas) introduced into the heat-exchange chamber (see, for example, Japanese Unexamined patent application, First Publication No. 2001-145542).

In this vehicle seat air-conditioner, conditioned air is fed from a blower through gas passages into the heat-exchange chamber provided on the underside of the seat covering layer, so that heat exchange is performed between the conditioned air and the seat covering layer while the conditioned air circulates through the heat-exchange chamber. Since the seat covering layer in contact with the occupant is heated or cooled by the conditioned air in the heat-exchange chamber in the case of this vehicle seat air-conditioner, the occupant sitting on the seat is able to directly sense warmth or coolness.

In addition, a vehicle seat air-conditioner has also been devised that has a blower for air conditioning disposed at the bottom of a seat cushion on which an occupant sits to blow out conditioned gas through conditioned gas flow passages formed in the cushion body of the seat cushion and out of blow-out holes penetrating the seat covering material (see, for example, Japanese Unexamined patent application, First Publication No. 2004-8334). In this vehicle seat air-conditioner, an accommodation space for disposing the blower at the bottom of the cushion body (pad material) is provided, and a plurality of branched flow passages for connecting the blow-out portion of the blower with the blow-out holes in the seat covering material are formed in the cushion body. The conditioned gas blown out from the blow-out holes hits the occupant sitting on the seat.

However, among such conventional vehicle seat air-conditioners, in the former, since the seat covering layer in contact with the occupant is heated or cooled through the heat-exchange chamber on the underside thereof, depending on the sitting posture and body shape of the occupant, contact with the seat covering layer may be inadequate, thereby hindering sensation of warmth or coolness.

Moreover, since the latter has the configuration in which a blower is disposed at the bottom of the cushion body of a seat cushion and a plurality of flow passages connecting the blower and the blow-out holes in the seat covering material are formed in the cushion body, in order to secure sufficient flow passage area of the conditioned gas while maintaining sitting comfort, it is necessary to increase the thickness of the cushion body, thereby hindering the application to thin seats. Thin seats have been desired in recent years due to seat design and vehicle layout considerations, and so the formulation of a seat air-conditioner that can reliably perform air conditioning without sacrificing sitting comfort even in such thin seats has been desired.

Apart from that, efficient energy use within a vehicle has been investigated in recent years, with the simultaneous pursuit of lower energy consumption and sitting comfort even in the above-mentioned vehicle temperature controller being a subject of study.

SUMMARY OF THE INVENTION

In view of these circumstances, it is therefore a first object of the present invention to provide a vehicle seat air-conditioner that can achieve a further improvement air condition performance.

In addition, it is a second object of the present invention to provide a vehicle seat air-conditioner that can also be applied to thin seats without sacrificing sitting comfort.

Furthermore, it is a third object of the present invention to provide a vehicle temperature controller that can simultaneously achieve both sitting comfort and a reduction in energy consumption.

The vehicle seat air-conditioner of the present invention includes: a seat on which an occupant sits; a seat temperature adjustment device that adjusts a temperature of a conditioned gas; a blower that supplies the conditioned gas to the seat; a seat covering layer provided on a surface of the seat and facing the seated occupant; and a flow channel provided on an underside of the seat covering layer that pass the conditioned gas that is introduced by the blower, wherein the vehicle seat air-conditioner is adapted to convey heat of the conditioned gas to an occupant side by directly blowing out a portion of the introduced conditioned gas to the occupant side, and to perform heat exchange with the occupant side via the seat covering layer by circulating a portion of a remainder of the conditioned gas through the flow channel.

The vehicle seat air-conditioner may further include blow-out holes through which a portion of the introduced conditioned gas is blown out to the occupant side, and an opening area of the blow-out holes in a sitting region may be varied in accordance with a surface pressure distribution therein due to sitting of the occupant.

The opening area may be set greater as a surface pressure due to sitting of the occupant is greater.

Moreover, the vehicle seat air-conditioner of the present invention includes: a seat on which an occupant sits; a seat temperature adjustment device that adjusts a temperature of a conditioned gas; a blower that supplies the conditioned gas to the seat; a seat covering layer provided on a surface of the seat and facing the seated occupant; and a flow channel provided on an underside of the seat covering layer that pass the conditioned gas that is introduced by the blower, wherein the blower is disposed inside of a side support provided on a side of the sitting region in the seat.

The vehicle seat air-conditioner may further include a tack groove extending along a width direction of the seat and into which the seat covering layer is pulled, and the vehicle seat air-conditioner may be adapted to introduce the conditioned gas into the flow channel by connecting a blow-out portion of the blower to the tack groove.

The flow channel may be formed by thread-like fiber that is capable of expanding and contracting in a thickness direction of the seat.

Furthermore, the vehicle temperature controller of the present invention includes: a vehicle seat air-conditioner having a seat temperature adjustment device that adjusts a temperature of a conditioned gas; a cabin air-conditioner that adjusts a cabin temperature; and an integrated control device that carries out integrated control of the seat temperature adjustment device and the cabin air-conditioner.

The integrated control device may correct upward a target control temperature of the cabin air-conditioner when the seat is in a cooled state by the seat temperature adjustment device.

The integrated control device may correct downward a target control temperature of the cabin air-conditioner when the seat is in a heated state by the seat temperature adjustment device.

DETAILED DESCRIPTION OF THE INVENTION

Below, an example of the vehicle seat air-conditioner according to the present invention will be explained with reference to FIGS. 1A to 5 as a first embodiment of the present invention.

Figure 1A:
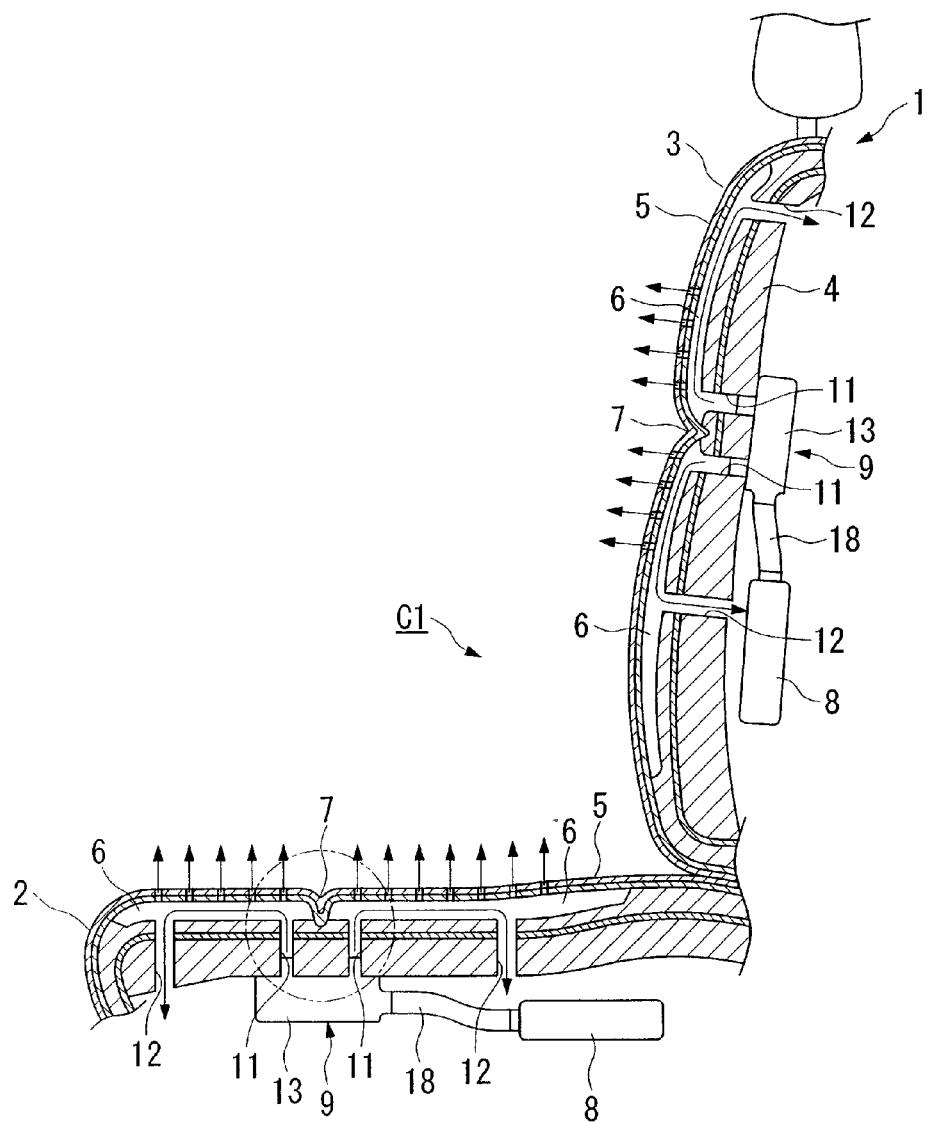
FIG. 1A is a cross-sectional view showing a vehicle seat air-conditioner according to a first embodiment of the present invention.
Figure 1B:
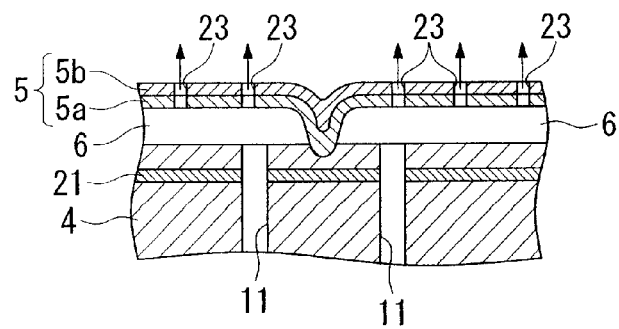
FIG. 1B is a cross-sectional view showing an enlargement of a portion of FIG. 1A.

As shown in FIGS. 1A and 1B, this vehicle seat air-conditioner C1 has a constitution including at least a seat 1 such as a driver's seat or a passenger seat, a seat covering layer 5 described hereinbelow, a blower 8, and a heat-exchange chamber (flow passage) 6.

Figure 2:
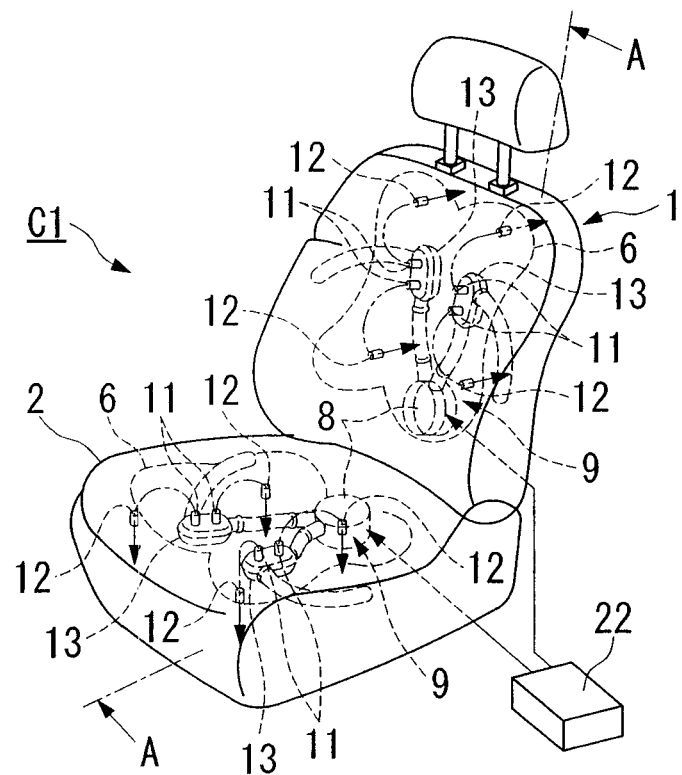
FIG. 2 is a schematic block diagram of the vehicle seat air-conditioner.

As shown in FIG. 2, identical constituent devices are arranged in a seat cushion 2 and a seat back 3 that constitute the seat 1. Hereinbelow, the constitution of the seat cushion 2 will be explained in detail, with identical portions of the seat back 3 side having the same reference numerals and redundant descriptions being omitted. Moreover, hereinbelow, air (gas) that is heated or cooled for cooling or heating is referred to "conditioned gas".

A cushion body 4 of the seat cushion 2 is covered with the seat covering layer 5 as shown in FIGS. 1A and 1B. A shallow concave portion is provided near the center of the top surface of the cushion body 4, that is, the region where the load of the occupant directly acts when the occupant is seated. The space formed between the concave portion and the seat covering layer 5 serves as a heat-exchange chamber 6. In this embodiment, the space portion (heat-exchange chamber 6) is divided into a plurality by a tack portion 7 into which the seat covering layer is pulled and fixed to the cushion body 4 side. Therefore, a plurality of independent heat-exchange chambers 6 are formed between the cushion body 4 and the seat covering layer 5. In addition, in this embodiment, a non-breathing thin film 21 is embedded near the outer surface of the cushion body 4, and the seat covering layer 5 has a two-layer structure which consists of a cushion sheet 5a on the underside, and a non-breathing cover sheet 5b on the upper side. Moreover, on the undersurface of the seat covering layer 5, a rigidity support material (not shown) having high rigidity on both sides and permeability is attached to the region where an occupant's load acts, and this rigidity support material is of a shape that is filled in the heat-exchange chambers 6.

An air conditioning unit 9 containing a blower 8 is disposed at the bottom side of the cushion body 4, and conditioned gas supply ports 10 of the air conditioning unit 9 are connected to the heat-exchange chambers 6 at the upper part of the cushion body 4. In the cushion body 4 are formed introduction passages 11 that connect the supply ports 10 with the heat-exchange chambers 6, and discharge passages 12 that discharge the gas supplied to the heat-exchange chambers 6 from the underside of the cushion body 4 to the outside. These introduction passages 11 and discharge passages 12 constitute the gas flow passage in this invention, with the heat-exchange chambers 6 being interposed in the middle of this gas flow passage.

Figure 3:
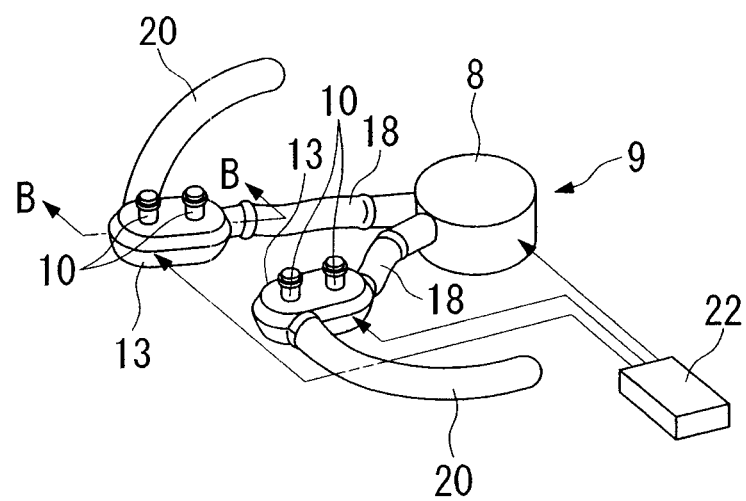
FIG. 3 is a perspective view showing a portion of the vehicle seat air-conditioner.
Figure 4:
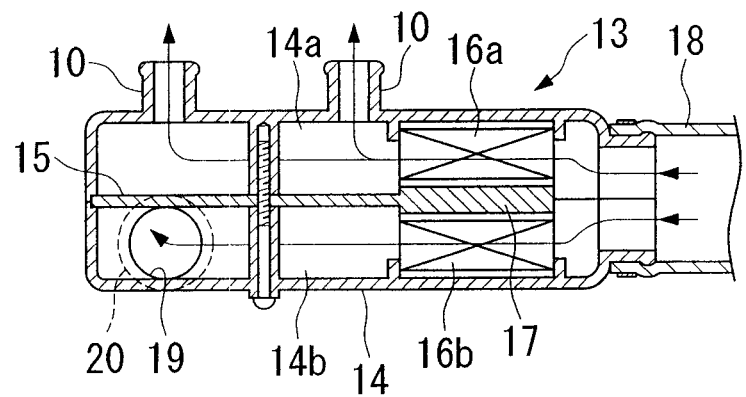
FIG. 4 is a cross-sectional view taken along the line B-B of FIG. 3.

In the air conditioning unit 9, as shown in FIG. 3, a pair of heat exchangers 13 are connected in parallel downstream of the blower 8, and after the air sent from the blower 8 is heated or cooled by each heat exchanger 13, it is fed to the heat-exchange chambers 6 from the supply ports 10. As shown in FIG. 4, the interior of a casing 14 of each heat exchanger 13 is divided into an upper chamber 14a and a lower chamber 14b by a partition wall 15, with heat sinks 16a, 16b disposed on the inlet side of the upper chamber 14a and the lower chamber 14b connected to the blower 8, respectively. A Peltier element 17 is arranged between the heat sinks 16a, 16b. The opposing heat-exchange surfaces of the Peltier element 17 are contact connected to both heat sinks 16a, 16b, with heat exchange performed between the heat sinks 16a and 16b, i.e., between the top chamber 14a and the bottom chamber 14b, in accordance with the current direction of the Peltier element 17. In addition, the inlet side of the top chamber 14a and the bottom chamber 14b is connected to the blower 8 by a common tube 18, and the downstream side of the bottom chamber 14b is connected to an exhaust pipe 20 shown in FIG. 2 and FIG. 3 through an outlet port 19. This exhaust pipe 20 discharges the air on the bottom chamber 14b side where heat exchange was performed by the Peltier element 17 to the outside of the seat 1.

In addition, the blower 8 of the air conditioning unit 9 and the electric current of the Peltier element 17 are controlled by a controller 22.

A plurality of blow-out holes 23 are formed in the portions of the seat covering layer 5 facing the heat-exchange chambers 6, with a portion of the conditioned air introduced into the heat-exchange chambers 6 being blown to the outside of the seat covering layer 5 through these blow-out holes 23.

Figure 5:
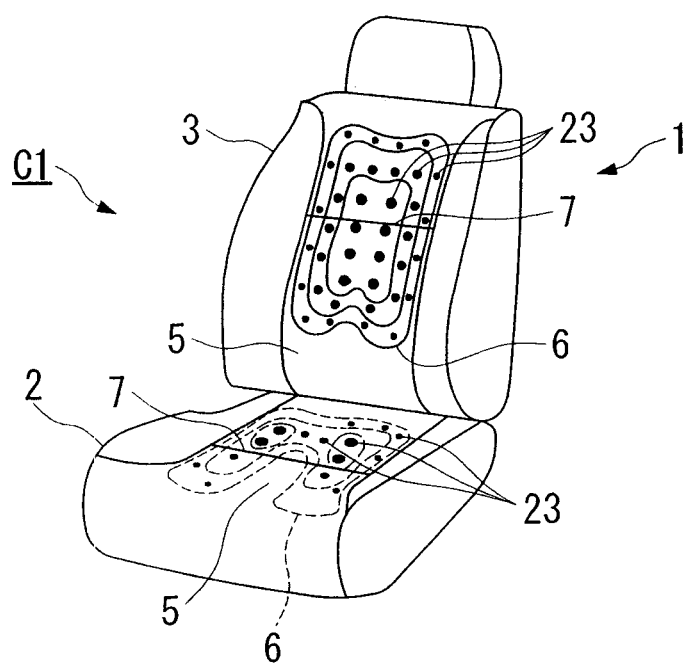
FIG. 5 is a perspective view showing the vehicle seat air-conditioner.

Moreover, in the case of this embodiment, the diameter (opening area) of the blow-out holes 23 is not uniform, and as shown in FIG. 5, the diameter of the blow-out holes 23 is configured to increase at those regions of the seat covering layer 5 where the surface pressure is higher during sitting on the seat.

Since a vehicle seat air-conditioner C1 of this embodiment is of the aforementioned constitution, the conditioned air in the upper chamber 14a side that is heat exchanged by the Peltier element 17 in the air conditioning unit 9 flows into the heat-exchange chambers 6 through the supply ports 10 and the introduction passages 11. By the time the conditioned air comes out of the discharge passage 12, it has performed heat exchange with the seal covering layer 5 and a portion of the conditioned air is emitted to the outside of the seat covering layer 5 through the blow-out holes 23. Therefore, supposing for example that cooling is being performed, cool air, which is conditioned air, directly cools the seat covering layer 5 in the heat-exchange chambers 6, and a portion of the cool air is blown to the top surface of the seat covering layer 5 through the blow-out holes. As a result, a cooling sensation is effectively imparted to the occupant seated on the seat 1 by the cooling of the contact portion of the seat covering layer 5 and the blowing of the cool air. During heating, a sensation of heating can be effectively imparted to the occupant with the same action just by replacing the cool air introduced to the heat exchange chambers 6 with warm air.

Moreover, since the vehicle seat air-conditioner C1 of this embodiment concurrently performs heat exchange of the seat covering layer 5 and blowing of conditioned air from the seat covering layer 5, a cooling sensation or a heating sensation can be imparted to the occupant by the blowing effect of the conditioned air even when the body of the occupant is not completely in close contact with the seat covering layer 5.

Furthermore, in the vehicle seat air-conditioner C1 of this embodiment, since the opening areas of the blow-out holes 23 are configured to increase the more the body of the occupant is strongly pressed against the seat covering layer 5, there are the advantages of the blow-out holes 23 not being easily plugged by the body of the occupant and a cooling sensation or warming sensation able to be reliably imparted to an occupant seated in the seat 1.

Furthermore, the vehicle seat air-conditioner C1 of this embodiment does not require routing of complicated air conditioning piping from outside of the seat 1 since conditioned air is generated by the Peltier element 17 in the air conditioning unit 9 arranged in every seat 1. Moreover, rapid air conditioning control can be individually performed for every seat in accordance with whether an occupant is seated or not. Also, since this device employs the Peltier element 17, in contrast to heating that utilizes heat of an internal combustion engine, warm conditioned air can be used immediately upon entering the vehicle, so that a heating sensation can be promptly imparted to an occupant by coupling the heat exchange (heating) with the aforementioned seat covering layer 5 itself and the effect of blowing conditioned air (warm air).

Figure 6:
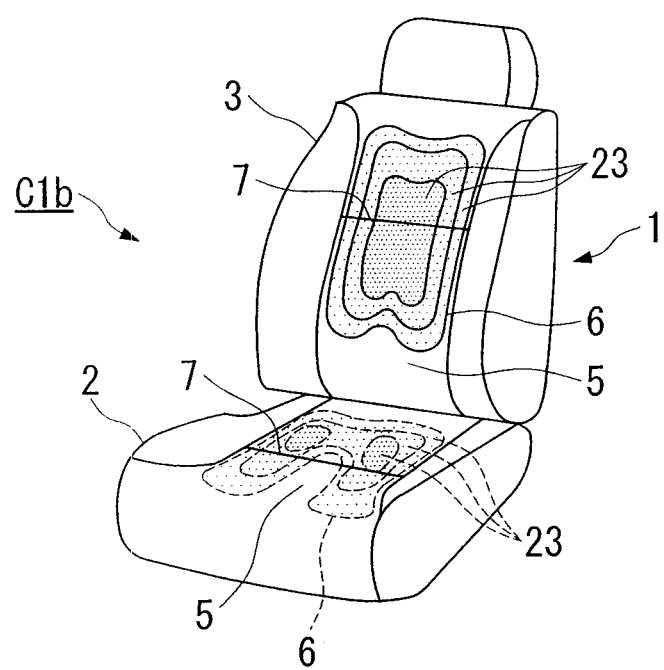
FIG. 6 is a perspective view showing a modification of the vehicle seat air-conditioner.

In the vehicle seat air-conditioner C1 as explained above, the example was given of the diameters of the blow-out holes 23 being configured to increase at those portions of the seat covering layer 5 where the surface pressure increases while an occupant is seated; however, it is not limited thereto. For example, FIG. 6 shows a vehicle seat air-conditioner C1b as a modification of the vehicle seat air-conditioner C1. As shown in this example, the diameter of the blow-out holes 23 may be made nearly uniform, while the formation density of the holes may be configured to be greater in correlation with those areas where the surface pressure increases while an occupant is seated. In this case as well, since the total opening area per unit area of the blow-out holes 23 increases in correlation with those areas of the seat covering layer 5 where the surface pressure increases, a cooling sensation or warming sensation can be reliably imparted to a seated occupant similarly to the case of the vehicle seat air-conditioner C1.

The vehicle seat air-conditioner according to the present invention is not limited to the aforementioned embodiments, with various design variations being possible within a range that does not depart from the spirit or scope thereof. In the above-mentioned embodiment, although the example was given of applying the vehicle seat air-conditioner C1 to the front side seats of a vehicle, it is not limited to the front seats and can also be applied, for example, to a bench-type seat in the rear side of a vehicle.

Moreover, in the above-mentioned embodiment, although an explanation was given of generation of conditioned air to be introduced into the heat-exchange chambers by a Peltier element, it is also possible to generate conditioned air with a well-known air conditioning system employing the heat of engine cooling water and the adiabatic expansion of refrigerant gas, and the like.

As a second embodiment of the present invention, other examples of the vehicle seat air-conditioner according to the present invention will be explained with reference to FIGS. 7 to 11.

Figure 7:
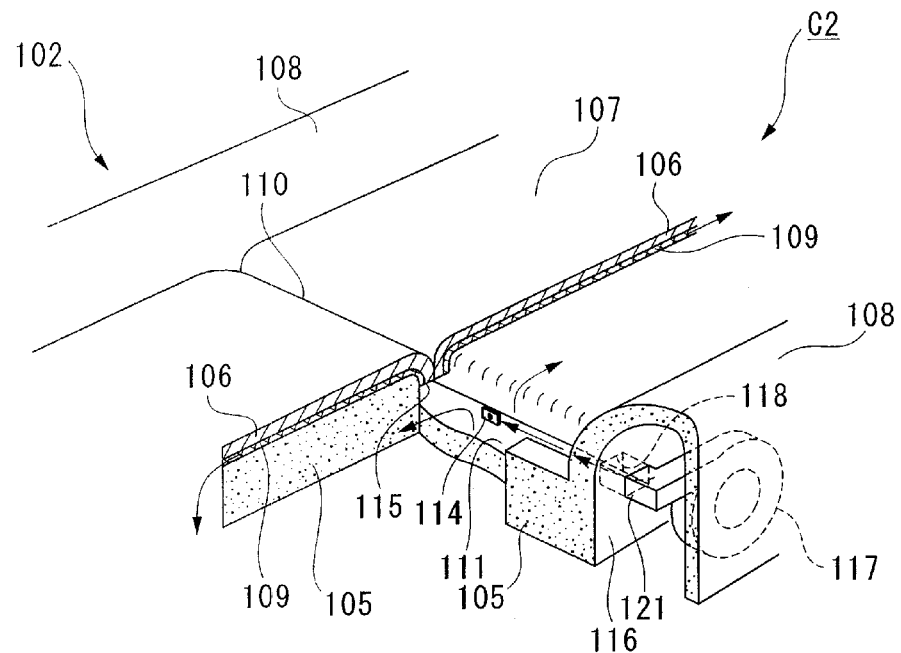
FIG. 7 is a partially broken perspective view showing the vehicle seat air-conditioner according to the second embodiment of the present invention.

As shown in FIG. 7, a vehicle seat air-conditioner C2 has a constitution equipped with at least a seat 101, such as a driver's seat or a passenger seat, a seat covering material (seat covering layer) 106 described hereinbelow, a blower 17, and flow passages that circulate conditioned gas. In addition, in FIG. 8, 102 is a seat cushion, 103 a seat back and 104 a headrest.

Figure 11:
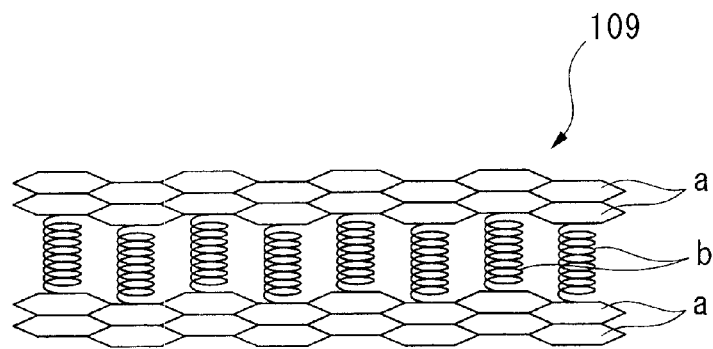
FIG. 11 is an enlarged cross-sectional view of a rigidity support material.

The seat cushion 102 has a basic structure in which a cushion body 105 consisting of a pad material is covered with the seat covering material 106, with side support portions 108, having a cross-section bulging in a mountain shape, provided on both sides of a sitting portion 107 on which an occupant sits. A sheet-shaped rigidity support material 109 (for example, material called a "Space Fabric" (registered trademark)) having permeability is bonded to the back surface of the sitting portion 107 of the seat covering material 106. It is desirable that this rigidity support material 109 has a constitution in which, as shown in FIG. 11, high rigidity fabric "a" is disposed on both sides, with the fabric "a" on both sides being connected by a thread-like fiber "b" which can expand and contract in the thickness direction. By using material of such a constitution, high surface rigidity is maintained while securing permeability, and, moreover, suitable elasticity that does not impair the function as a cushion can be obtained.

Figure 8:
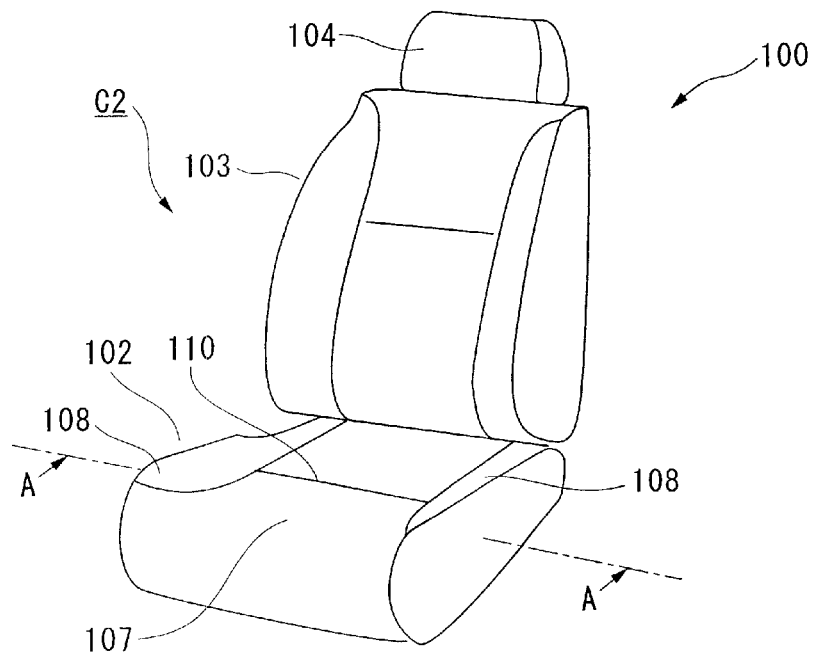
FIG. 8 is a perspective view showing this vehicle seat air-conditioner.

In addition, a tack portion 110 that pulls in a portion of the seat covering material 106 toward the inside of the cushion body 105 is provided near the center of the sitting portion 107, in a longitudinal direction, of the seat cushion 102 as shown in FIGS. 7 and 8. This tack portion 110 is constituted to form a tack groove 111 on the top surface of the cushion body 105 that extends along the seat width direction, with the seat covering material 106 being pulled into the tack groove 111 and intermittently engaged by a lock fitting 112 at the bottom of the tack groove 111 as shown in FIG. 9.

Figure 10:
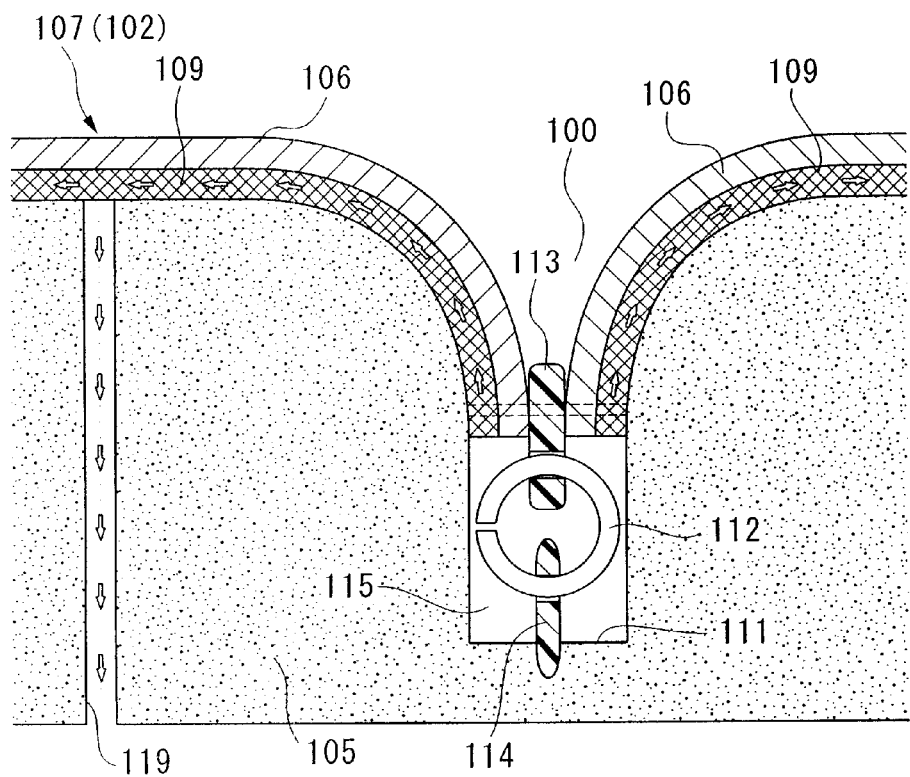
FIG. 10 is an enlarged cross-sectional view taken along the line B-B of FIG. 9.

Specifically, in the tack portion 110, as shown in FIG. 10, the end portions of two sheets of seat covering material 106 having the aforementioned rigidity support material 109 bonded to the back side thereof are stitched together in a state of a resin board 113 sandwiched therebetween. A plurality of locations of the resin board 113 are fastened to an anchoring resin hoard 114 embedded at the bottom of the tack groove 111 by the C-shaped lock fittings 112. After locking the lock fitting 112 to the seat covering material 106 side and tack groove 111 side resin boards 113, 114, the lock fitting 112 is deformed to close the opening of the C-shape. Moreover, although the stitched portion of the seat covering material 106 located in the tack portion 110 is fixed at the bottom of the tack groove 111 by the aforementioned lock fittings 112, the end of the stitched portion, after being engaged by the lock fittings 112, forms an extended space 115 that extends in the seat-width direction along the bottom of the tack groove 111. This extended space 115 forms a part of the flow passage for the conditioned gas to be described hereinbelow.

Moreover, an accommodation space 116 is provided inside the cushion body 105 of the side support portion 108 on each side, with a blower 117 for feeding conditioned gas being arranged in each accommodation space 116. Although the blower 117 may be arranged alone in this accommodation space 116 and connected by piping with a heat exchange unit located outside the seat, an air conditioning unit including a heat exchange unit such as a Peltier element may be integrated with the blower 17 and arranged as a unit in the accommodation space 116.

Figure 9:
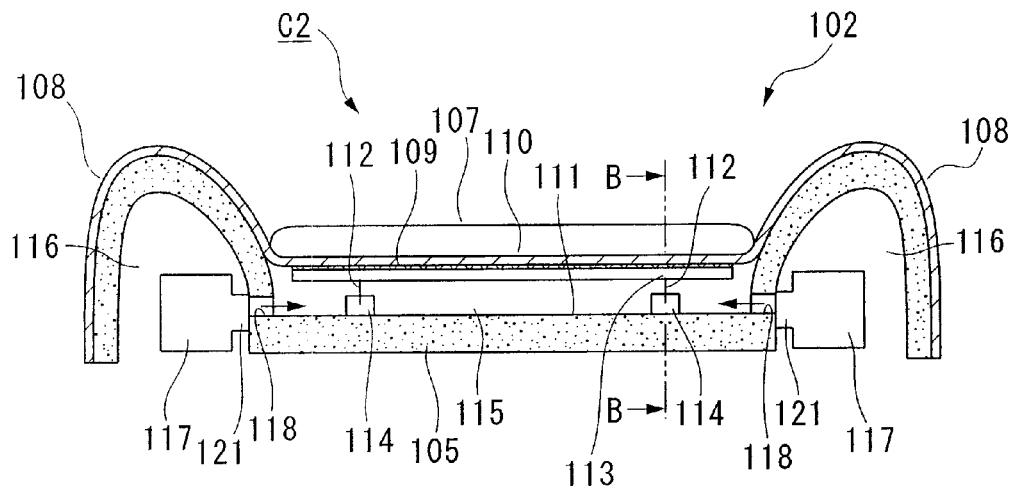
FIG. 9 is a cross-sectional view taken along the line A-A of FIG. 8.

As shown in FIG. 7 and FIG. 9, an introduction hole 118 which communicates with a blow out portion 121 of the blower 117 is formed in the side wall facing the extending space 115 of the side support 108, and the conditioned gas fed from the blower 117 flows into the extended space 115 through the introduction hole 118. And the conditioned gas which flows into the extended space 115 passes along the interior of the rigidity support material 109 on the underside of the seat covering material 106 and is introduced into the under-face side of the sitting portion 107 of the seat covering material 106. Moreover, discharge passages 119 utilizing the joints between blocks of padding material are provided in the cushion body 105, with conditioned gas being discharged from the under-face side of the seat covering material 106 to the seat bottom side through the discharge passages 119. In this seat air-conditioner, the rigidity support material 109 and the discharge passages 119 constitute the flow passage for conditioned gas together with the above-mentioned extended space 115.

In this vehicle seat air-conditioner C2, while the conditioned gas passes through the interior of the rigidity support material 109, heat exchange is performed between the conditioned gas and the region of the seat covering material 106 where the occupant is seated, with the sitting region of the seat covering material 106 being thereby heated or cooled by the conditioned gas. As a result, warmth or coldness is transmitted to the occupant seated in the seat 101 through the contact portion with the seat covering material 106.

In the vehicle seat air-conditioner C2, since the blower 117 is arranged inside the side supports 108 on the side of the occupant sitting region as explained above, compared to conventional constitutions in which the blower 117 is disposed at the bottom of the cushion body 105, it is possible to lessen the total thickness of the cushion body 105 below the sitting region for attaining similar cushion performance. Moreover, since the extended space 115 under the tack portion 110 that extends in the seat width direction and the rigidity support material 109 bonded to the undersurface of the sitting portion of the seat covering material 106 serve as flow passages of the conditioned gas without flow passages for the conditioned gas being specially formed in the cushion body 105, there is no need to increase the thickness of the cushion body 105 to form conditioned gas flow passages in the cushion body 105. This greatly contributes to lessening the thickness of the cushion body 105. In the case of adopting this vehicle seat air-conditioner C2, it is thereby possible to make the seat cushion 102 into a sufficiently thin shape without sacrificing sitting comfort. Therefore, substantially greater freedom is allowed in seat design and vehicle body layout.

Moreover, in this vehicle seat air-conditioner C2, since the rigidity support material 109 itself can be used as a flow passage for the conditioned gas by having the end portion of the rigidity support material 109 bonded to the underside of the occupant sitting region of the seat covering material 106 face the extended space 115, there is no need to form a dedicated heat exchange chamber facing the underside of the seat covering material 106 on the top surface of the cushion 105, thereby affording the advantage of flow passage formation being easy.

Furthermore, in this vehicle seat air-conditioner C2, there is also the advantage that since the conditioned gas is introduced from the extended space 115 at the lower face side of the tack portion 110 along the underside of the seat covering material 106, the flow of the conditioned gas is smooth, and uniform heat exchange is easily performed over nearly the entire region of the sitting portion 107. More specifically, since the seat covering 106 is smoothly drawn in a curve toward the tack groove 111 as shown in FIG. 10, the conditioned air flowing into the extended space 115 smoothly flows along the curved shaped of the seat covering material 106 and easily spreads into all corners of the undersurface of the sitting portion 107.

Furthermore, in this vehicle seat air-conditioner C2, since the seat covering material 106 at the tack portion 110 and the bottom of the tack portion 110 are connected by lock fittings 112, conditioned gas reliably flows through the ring-shaped inside space of the lock fittings 112 even in the case of using large lock fittings 112 that simplify fitting work of the seat covering material 106. Therefore, in the case of the device of the present embodiment, there is also an advantage that the lock fittings 112 hardly hinder the flow of the conditioned gas flowing through the extended space 115.

Figure 12:
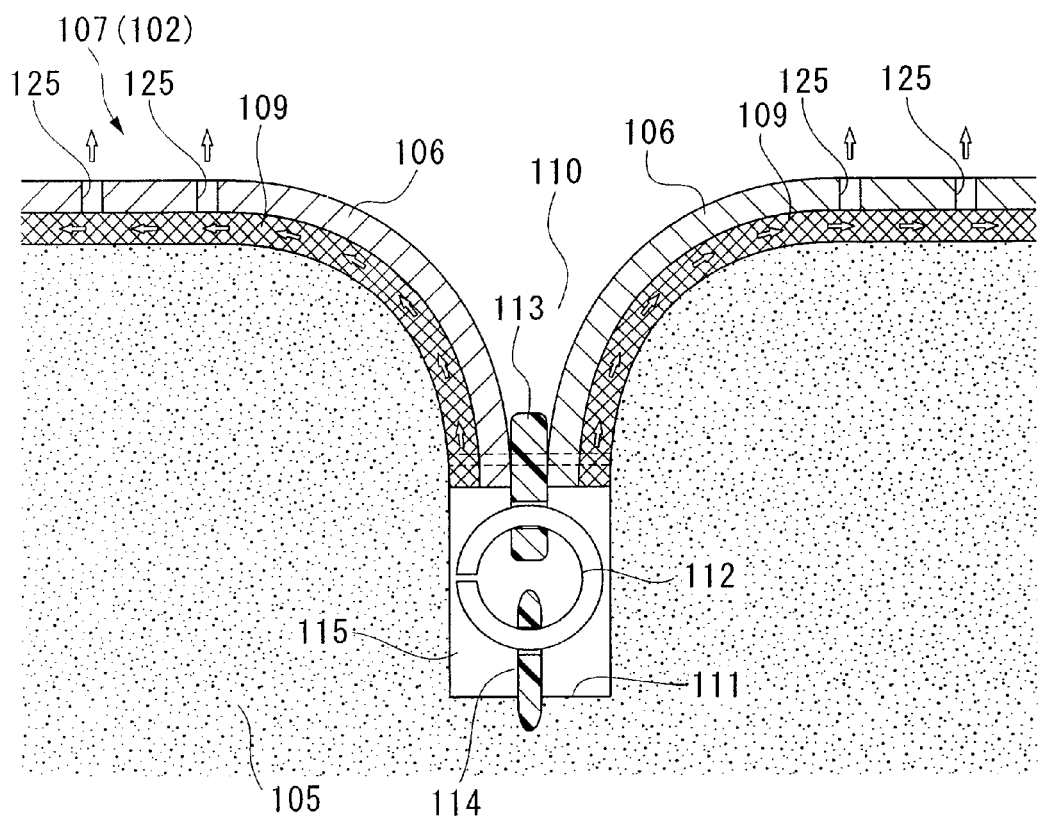
FIG. 12 is an enlarged cross-sectional view equivalent to FIG. 9 showing another embodiment of the present invention.

The vehicle seat air-conditioner according to the present invention is not limited to the aforementioned embodiments, with various design variations being possible within a range that does not depart from the spirit or scope thereof. For example, in the vehicle seat air-conditioner C2 as described above, the example was given of conditioned gas that flowed into the under-face side of the seat covering material 106 along the extended space 115 of the tack portion 110 and the rigidity support material 109 being discharged to below the cushion 105 through discharge passages 119; however, it is not limited thereto. For example, as a modification shown in FIG. 12, a plurality of blow-out holes 125 may be formed in the sitting portion 107 of the seat covering material 106, so that conditioned air introduced to the back face side of the seat covering material 106 through the extended space 115 and the rigidity support material 109 is blown to the occupant side through the blow-out holes 125. In this case, similarly to the above-mentioned embodiment, the seat cushion 102 can be made into a sufficiently thin shape without sacrificing sitting comfort.

Next, as the third embodiment of the present invention, an example of the vehicle temperature controller according to the present invention is explained with reference to FIGS. 13 to 15.

Figure 13:
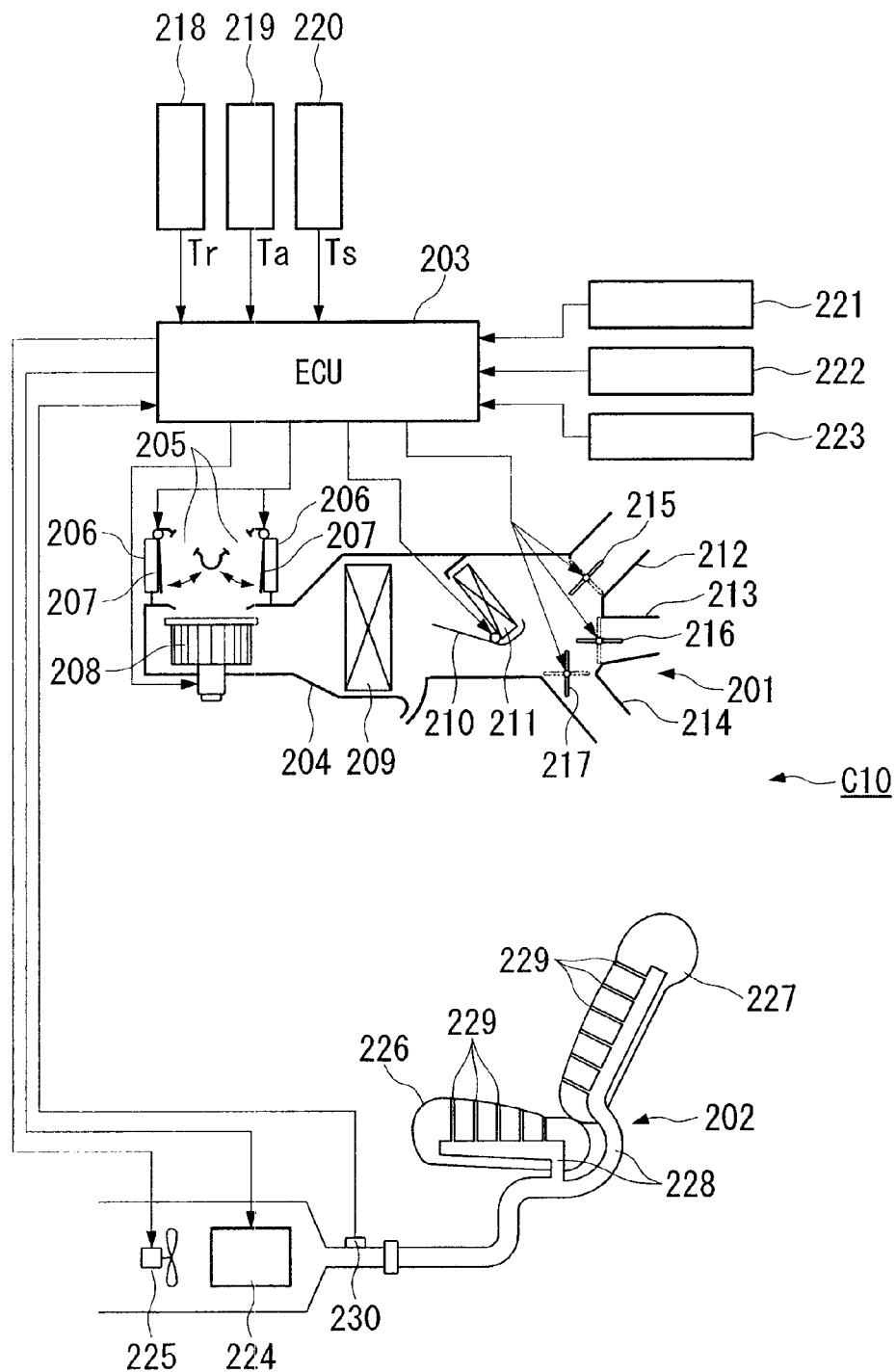
FIG. 13 is a schematic block diagram showing the vehicle temperature controller according to the third embodiment of the present invention.

FIG. 13 shows a general structure of the vehicle temperature controller according to the present invention. A vehicle temperature controller C10 includes a cabin air-conditioner 201 that adjusts the in-cabin air conditioning temperature; a seat temperature adjustment device 202 that adjusts the temperature of a seat; and an electronic control unit (integrated control device: hereafter referred to as "ECU") 203 that carries out integrated control of the aforementioned devices.

Provided in the cabin air-conditioner 201 are a fan duct 204, an outside air inlet 205 that takes in the air outside a vehicle (outside air) to the upstream side of the fan duct 204, and an inside air inlet 206 that sucks in the air in the cabin (inside air). In addition, near the outside air inlet 205 and the inside air inlet 206 is provided an inside/outside air damper 207, with switching between inside air and outside air being performed by this inside/outside air damper 207.

A blower 208 is provided in the fan duct 204, with an evaporator 209 that constitutes a refrigerating cycle, an air mix damper 210, and a heater core 211 through which engine cooling water circulates formed on the downstream side of this blower 208. The air mix damper 210 adjusts the proportion of the inside air that that passes the heater core 211, and the inside air that does not pass, and by this proportion adjustment adjusts the temperature of the blow-off air.

Moreover, a DEF air outlet 212 that blows air toward the windshield of a vehicle, a FACE air outlet 213 that blows air toward the upper half of the driver's body, and a FOOT air outlet 214 that blows air towards the lower half of a driver's body are provided on the downstream side of the fan duct 204. Open/close adjustment dampers 215 to 217 are provided for the air outlets 212 to 214, respectively, so that the air outlets through which air leaves can be selected by opening/closing adjustment of the dampers 215 to 217.

An inside air temperature sensor 218 that detects the cabin air temperature, an outside air temperature sensor 219 that detects the temperature outside the vehicle, and a solar radiation sensor 220 that detects the amount of insolation at the installation location in the cabin are connected to the ECU 203. The ECU 203 performs automatic control of the cabin air-conditioner 201 based on detection signals Tr, Ta, and Ts from the respective sensors. Moreover, an air-conditioner operation panel 221 and a seat operation panel 222 are connected to the ECU 203, and an interlock switch 223 that interlocks the cabin air-conditioner 201 and the seat temperature adjustment device 202 is connected to the ECU 203. In addition to a power switch, an operation changeover switch for switching between automatic operation and manual operation, a temperature setting switch, and an air outlet selection switch and the like are provided on the air-conditioner operation panel 221, with the operation signals from these switches being input into the ECU 203.

The ECU 203 mainly consists of a microcomputer, with a map that refers to a control program and control data being stored in the built-in ROM. The ECU 203 regulates the cabin temperature to a preset temperature according to the inside and outside air temperature and insolation amount during automatic operation, monitors input of the interlock switch 223, and performs correction processing of the target blow-out temperature (target control temperature) of the cabin air-conditioner 201 when an ON signal is input from the interlock switch 223. This correction processing is described in detail hereinbelow.

The seat temperature adjustment device 202 consists of a seat that includes a cushion 226 and a seat back 227; a heat exchanger 224 installed outside the seat that performs cooling and heating of blowing air (gas); a blower 225 that feeds air to the heat exchanger 224; introduction passages 228 that supply air (conditioned gas) that passed through the heat exchanger 224 to the interior of the seat cushion 226 and the seat back 227; and a plurality of blow-out holes 229 that blow out the air supplied to the introduction passages 228 to the outside from the outer skin of the seat cushion 226 and the seat back 227. It is preferable that the seat used here have an equivalent constitution to the seats in the aforementioned first or second embodiments.

In the seat temperature adjustment device 202, the output of the heat exchanger 224 and the blower 225 are controlled by the ECU 203, and the temperature of the seat covering portion in close contact with the occupant is controlled by the temperature and quantify of the air blown out from the blowout holes 229. When using components that allow miniaturization, such as a Peltier element and the like, in the heat exchanger 224, the heat exchanger 224 and the blower 225 may be installed in the seat cushion 226 portion. Moreover, a temperature sensor 230 is provided on the introduction passage 228 near the heat exchanger 224, and the temperature signal detected with the temperature sensor 230 is input into the ECU 203.

The seat operation panel 222 is provided with a power switch that turns ON/OFF operation of the heat exchanger 224 and the blower 225; a mode change-over switch which switches between warm air and cool air; and a temperature control switch that adjusts the blowing temperature, with these operation signals being input into the ECU 203.

In the vehicle temperature controller C10, when the above-mentioned interlock switch 223 is turned OFF, the cabin air-conditioner 201 and the seat temperature adjustment device 202 can each be independently operated. However, when the interlock switch 223 is turned ON, the ECU 203 applies correction processing to the target blow-out temperature (target control temperature) of the cabin air-conditioner 201 depending on the operation condition of the seat temperature adjustment device 202.

Specifically, the correction means constituted by the ECU 203 determines whether the seat temperature adjustment device 202 is OFF, in cooling operation or heating operation, and performs the following correction processing during cooling operation and heating operation. More specifically, at the time of cooling operation, upward correction of preset temperature $\Delta T$ is performed with respect to the target blow-out temperature Tao of the cabin air-conditioner 201.

On the other hand, at the time of (2) heating operation, downward correction of preset temperature $\Delta T$ is performed with respect to the target blow-out temperature Tao of the cabin air-conditioner 201.

In addition, although the preset temperature $\Delta T$ may be a steady value, it may also be determined by calculations according to the state of divergence of the target blow-out temperature Tao and the present cabin air temperature or based on a map value.

Figure 14:
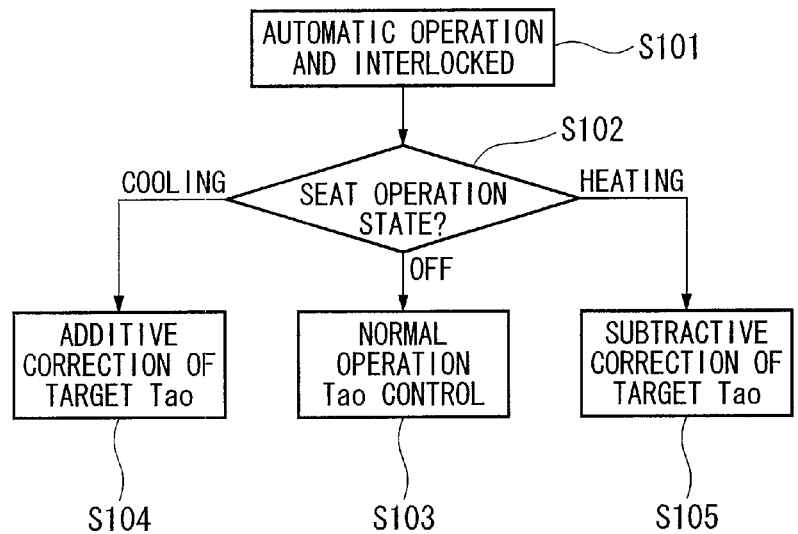
FIG. 14 is a flowchart showing the flow of control in this vehicle temperature controller.

The flow of control when the interlock switch 223 is ON is as shown in the flowchart of FIG. 14.

Namely, in the ECU 203, in step S101, the process progresses to the next step S102 when the cabin air-conditioner 201 is in automatic operation and the interlock switch 223 is ON. In step S102, the operation state of the seat temperature adjustment device 202 is determined. When the seat temperature adjustment device 202 is OFF, the process progresses to step S103 and the target blow-out temperature Tao is maintained. When the seat temperature adjustment device 202 is in cooling operation, the process progresses to step S104, and when in heating operation, it progresses to step S105. In steps S104 and S105, the aforementioned processes (1) and (2) are executed respectively, and the target blow-out temperature Tao is appropriately corrected.

In the vehicle temperature controller C10, when the cabin air-conditioner 201 is in automatic operation and the interlock switch 223 is ON as described above, when cooling (blowing out cool air) of a seat is performed by the seat temperature adjustment device 202, the target blow-out temperature Tao of the cabin air-conditioner 201 will be corrected upward. At this time, since cool air being blown from the seat directly cools the seat and the seated occupant, even if the temperature of the blown air of the cabin air-conditioner 201 is corrected upward, the occupant seated in the seat can sense a sufficient cooling sensation.

Figure 15:
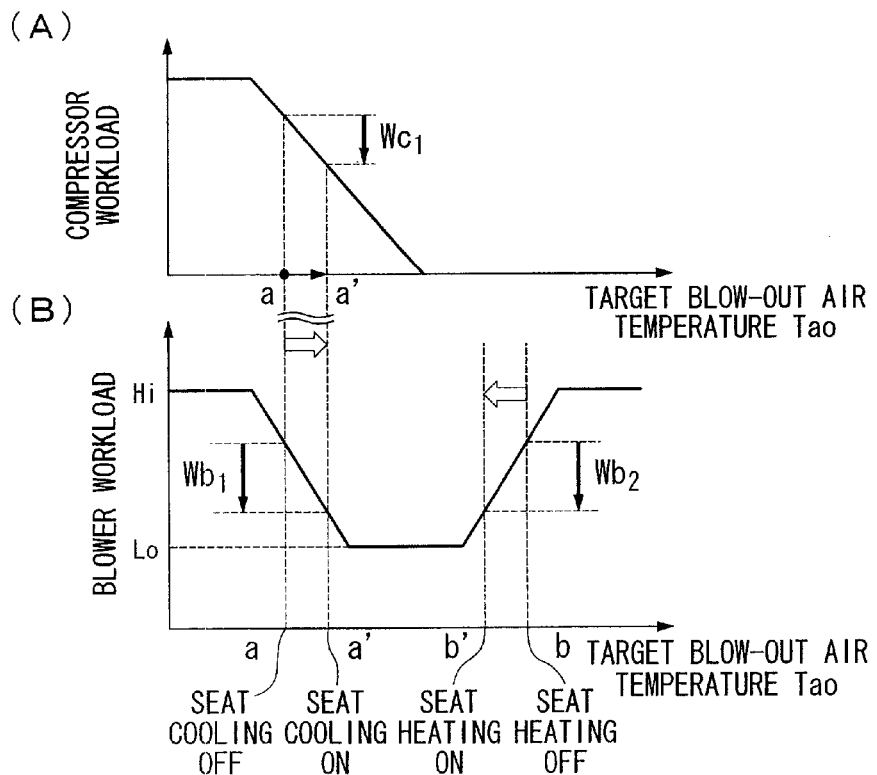
FIG. 15 (A) is a characteristic curve showing the relation between the target blow-out temperature in this vehicle temperature controller, and compressor workload, and FIG. 15 (B) is a characteristic curve showing the connection between the target blow-out temperature in this vehicle temperature controller, and the blower workload.

When the target blow-out temperature Tao of the cabin air-conditioner 201 is at this time corrected upward from a to a' as shown in FIG. 15, the compressor workload which constitutes the refrigerating cycle decreases by $Wc_1$, and the workload of the blower 208 similarly decreases by $Wb_1$. Therefore, with this vehicle temperature controller, at the time of cooling operation, energy consumption can be reduced by the workload amount totaling $Wc_1$ and $Wb_1$.

Moreover, when the cabin air-conditioner 201 is in automatic operation and the interlock switch 223 is ON, heating (blowing out warm air) of the seat by the seat temperature adjustment device 202 causes the target blow-out temperature Tao of the cabin air-conditioner 201 to be corrected downward. At this time, since warm air being blown from the seat directly warms the seat and the seated occupant, even if the temperature of the blown air of the cabin air-conditioner 201 is corrected downward, the occupant seated in the seat can sense a sufficient heating sensation.

When the target blow-out temperature Tao of the cabin air-conditioner 201 is at this time corrected downward from b to b' as shown in part (B) of FIG. 15, the blower workload decreases by $Wb_2$. Therefore, with this vehicle temperature controller C10, at the time of warming operation, energy consumption can be reduced by the workload amount $Wb_2$.

The vehicle temperature controller according to the present invention is not limited to the aforementioned embodiments, with various design variations being possible within a range that does not depart from the spirit or scope thereof. For example, the above-mentioned embodiment employed the seat temperature adjustment device 202 of a type that blows out cooling air or warming air from the outer skin of the seat cushion 226 and the seat back 227; however, it is also possible to use a seat temperature adjustment device of a type that performs heat exchange with the seat covering at the under-surface without directly blowing out air from the seat cushion 226 and the seat back 227.

What is claimed is:

1. A vehicle seat air-conditioner comprising:
   a seat adapted to receive an occupant, the seat including a seat back and a seat cushion, the seat cushion including first and second side support portions and a sitting portion, the first and second side support portions each having a cross-section that is bulging in a convex shape, the first and second side support portions being disposed on opposite lateral sides of the sitting portion;
   a heat exchanger that adjusts a temperature of a conditioned gas;
   a blower that supplies the conditioned gas to the seat;
   a seat covering layer defining an outer surface of the seat; and
   a cushion body that is covered by the seat covering layer, wherein
   the vehicle seat air-conditioner is adapted to convey heat between the conditioned gas and the occupant, and
   the blower is disposed within the first side support portion.

2. The vehicle seat air-conditioner according to claim 1, further comprising
   a flow channel defined by a space between the cushion body and the seat covering layer, and extending along a surface of the seat, the flow channel receiving the conditioned gas from the blower.

3. The vehicle seat air-conditioner according to claim 2, wherein
   the seat covering layer is adapted to convey heat of the conditioned gas flowing through the flow channel to the occupant.

4. The vehicle seat air-conditioner according to claim 2, further comprising
   a blow-out hole formed in the seat covering layer and connected to the flow channel, the conditioned gas flowing through the flow channel being blown out through the blow-out hole toward the occupant.

5. The vehicle seat air-conditioner according to claim 1, wherein
   at least a portion of the blower is disposed above a bottom surface of the cushion body.

6. The vehicle seat air-conditioner according to claim 1, further comprising
   a tack groove provided in the cushion body, wherein the seat covering layer is pulled into the tack groove.

7. The vehicle seat air-conditioner according to claim 6, wherein
   the tack groove extends along a width direction of the seat.

8. The vehicle seat air-conditioner according to claim 7, wherein the blower includes a blow-out portion,
   wherein a space between the cushion body and the seat covering layer defines a flow channel, and
   wherein the vehicle seat air-conditioner is adapted to introduce the conditioned gas into a flow into the flow channel by connecting the blow-out portion of the blower to the tack groove.

9. The vehicle seat air-conditioner according to claim 1, wherein
   a lateral distance between the first and second side support portions is greater than a lateral distance between a first boundary between the first support portion and the sitting portion and a second boundary between the second support portion and the sitting portion, and
   the seat back includes third and fourth side support portions and a flat portion, the third and fourth side support portions being laterally spaced from one another by the flat portion with a lateral distance therebetween which is greater than a lateral distance between a third boundary between the third support portion and the flat portion and a fourth boundary between the fourth support portion and the flat portion.

10. A vehicle seat air-conditioner comprising:
    a seat adapted to receive an occupant, the seat including
       a seat back and a seat cushion, the seat cushion including first and second side support portions and a sitting portion, the first and second side support portions being laterally spaced from one another by the sitting portion, wherein the first and second side support portions each include a void that defines an accommodation space;
    a heat exchanger that adjusts a temperature of a conditioned gas; and a blower that supplies the conditioned gas to the seat, wherein the blower is disposed within the accommodation space of the first side support portion.

11. The vehicle seat air-conditioner of claim 10, wherein the first and second side support portions each have a cross-section that is bulging in a convex shape, and wherein the first and second side support portions are disposed on opposite lateral sides of the sitting portion.

12. The vehicle seat air-conditioner of claim 10, further comprising:
a seat covering layer defining an outer surface of the seat; and
a cushion body that is covered by the seat covering layer, wherein the vehicle seat air-conditioner is adapted to convey heat between the conditioned gas and the occupant.

13. The vehicle seat air-conditioner according to claim 12, further comprising
a flow channel defined by a space between the cushion body and the seat covering layer, and extending along a surface of the seat, the flow channel receiving the conditioned gas from the blower.

14. The vehicle seat air-conditioner according to claim 13, wherein
the seat covering layer is adapted to convey heat of the conditioned gas flowing through the flow channel to the occupant.

15. The vehicle seat air-conditioner according to claim 12, wherein
at least a portion of the blower is disposed above a bottom surface of the cushion body.

16. The vehicle seat air-conditioner according to claim 12, further comprising
a tack groove provided in the cushion body, wherein the seat covering layer is pulled into the tack groove.

17. The vehicle seat air-conditioner according to claim 16, wherein
the tack groove extends along a width direction of the seat.

18. The vehicle seat air-conditioner according to claim 17, wherein the blower includes a blow-out portion,
wherein a space between the cushion body and the seat covering layer defines a flow channel, and
wherein the vehicle seat air-conditioner is adapted to introduce the conditioned gas into the flow channel by connecting the blow-out portion of the blower to the tack groove.

19. The vehicle seat air-conditioner according to claim 10, wherein
a lateral distance between the first and second side support portions is greater than a lateral distance between a first boundary between the first support portion and the sitting portion and a second boundary between the second support portion and the sitting portion, and
the seat back includes third and fourth side support portions and a flat portion, the third and fourth side support portions being laterally spaced from one another by the flat portion with a lateral distance therebetween which is greater than a lateral distance between a third boundary between the third support portion and the flat portion and a fourth boundary between the fourth support portion and the flat portion.

* * * * *